United States Patent
Galbiati

(10) Patent No.: US 11,063,282 B2
(45) Date of Patent: Jul. 13, 2021

(54) SEPARATION SYSTEM

(71) Applicant: Cristiano Galbiati, Forte (IT)

(72) Inventor: Cristiano Galbiati, Forte (IT)

( * ) Notice: Subject to any disclaimer, the term of this patent is extended or adjusted under 35 U.S.C. 154(b) by 0 days.

(21) Appl. No.: 16/623,435

(22) PCT Filed: Jun. 25, 2018

(86) PCT No.: PCT/IB2018/054658
§ 371 (c)(1),
(2) Date: Dec. 17, 2019

(87) PCT Pub. No.: WO2018/235059
PCT Pub. Date: Dec. 27, 2018

(65) Prior Publication Data
US 2020/0388869 A1    Dec. 10, 2020

(30) Foreign Application Priority Data

Jun. 23, 2017 (IT) ................ 102017000070755

(51) Int. Cl.
| | | |
|---|---|---|
| *H01M 8/0606* | (2016.01) | |
| *B01J 19/08* | (2006.01) | |
| *C01B 3/04* | (2006.01) | |
| *C01B 3/50* | (2006.01) | |
| *H01M 8/04082* | (2016.01) | |
| *H01M 8/0662* | (2016.01) | |

(52) U.S. Cl.
CPC .......... *H01M 8/0606* (2013.01); *B01J 19/08* (2013.01); *C01B 3/047* (2013.01); *C01B 3/503* (2013.01); *H01M 8/04201* (2013.01); *H01M 8/0687* (2013.01); *B01J 2219/0871* (2013.01); *B01J 2219/0875* (2013.01); *B01J 2219/0898* (2013.01); *C01B 2203/041* (2013.01)

(58) Field of Classification Search
CPC ............. C01B 3/04; C01B 3/047; B01J 19/08
See application file for complete search history.

(56) References Cited

U.S. PATENT DOCUMENTS

| | | | | |
|---|---|---|---|---|
| 3,198,604 A | * | 8/1965 | Pfefferle | ............. H01M 8/0606 |
| | | | | 423/658.2 |
| 5,843,395 A | * | 12/1998 | Wang | .................. C01B 17/0495 |
| | | | | 423/573.1 |

(Continued)

FOREIGN PATENT DOCUMENTS

CN       1861519 A     11/2006

OTHER PUBLICATIONS

Shinji Kam Bara et al: "Hydrogen 1-10; Production from Ammonia Using a Plasma Membrane Reactor", Journal of Sustainable Development of Energy, Water and Environment Systems, vol. 4, No. 2, 2016, pp. 193-202, XP055430994, ISSN: 1848-9257, DOI: 10.13044/j.sdewes.2016.04.0016 the whole document.

*Primary Examiner* — Matthew J Merkling
(74) *Attorney, Agent, or Firm* — Rumit Ranjit Kanakia

(57) ABSTRACT

(EN) The present invention relates to the field of high efficiency and high flow hydrogen generation and purification from a hydrogen tank provided in the form of ammonia (NH3). In particular, the present invention describes in particular an innovative and compact system for the dissociation of ammonia and therefore the production of molecular hydrogen (H2), all in a cycle totally free of carbon (hence carbon emissions), as well as by the generation of nitrogen oxide and nitric dioxide (NOx).

10 Claims, 2 Drawing Sheets

(56) References Cited

U.S. PATENT DOCUMENTS

| | | | |
|---|---|---|---|
| 7,037,484 B1 | 5/2006 | Brandenburg | |
| 2002/0028171 A1* | 3/2002 | Goetsch | B01J 12/007 |
| | | | 423/237 |
| 2004/0010173 A1* | 1/2004 | Agarwal | C01B 3/04 |
| | | | 585/538 |
| 2007/0259228 A1* | 11/2007 | Hartvigsen | H01M 8/145 |
| | | | 429/422 |
| 2015/0174550 A1* | 6/2015 | Tranquilla | B01J 19/088 |
| | | | 204/157.42 |
| 2015/0238922 A1 | 8/2015 | Kambara et al. | |
| 2019/0393523 A1* | 12/2019 | Miura | H01M 8/04626 |
| 2020/0197889 A1* | 6/2020 | Jo | C01B 3/503 |

\* cited by examiner

SEPARATION SYSTEM

TECHNICAL FIELD

The present invention concerns the field of high-efficiency and high-flux hydrogen generation and purification from a reservoir of hydrogen stocked in form of anhydrous ammonia ($NH_3$). In particular, the present invention describes an innovative and compact system for the dissociation of ammonia and thereby production of molecular hydrogen ($H_2$), all in a cycle entirely free from carbon (hence carbon emissions) as well from generation of nitric oxide and nitric dioxide (NOx). This innovative system is designed to a substantially complete recover the enthalpy, that is an optimized recovery of enthalpy required for heating the anhydrous ammonia feed stream to the working temperature required for the dissociation process, as well as to eliminate even small traces of anhydrous ammonia and hydrogen potentially entering the waste stream, which in turn ensures that the waste stream is virtually composed of only molecular nitrogen ($N_2$) from the ammonia dissociation and water vapors ($H_2O$) from the hydrogen oxidation in the associated fuel cells.

BACKGROUND ART

It is known by the person skilled in the art that $NH_3$ is an efficient hydrogen carrier and energy storage medium. The many enticing facets of ammonia include: the very high mass fraction of hydrogen (18%); the possibility of storing it as a liquid at room temperature and moderate (8.5 bar) pressure; the high energy value per unit volume; the possibility of producing ammonia anywhere from any conceivable source of energy (coal, natural gas, nuclear, hydroelectric, wind, solar, biomass, hydrothermal, tidal), given that its main ingredients, nitrogen and hydrogen, are easily extracted from the atmosphere and from water.

The possibility of production from any source of energy is, in fact, common to hydrogen itself, another element under consideration for energy storage; however, the storage of ammonia is much more flexible, efficient, and safe than that of hydrogen. In addition, ammonia is the most fundamental ingredient for the large-scale production of fertilizers for intensive agricultural cultivations: as a result, ammonia constantly ranks among the three chemical products with the largest production in the world, and significant infrastructures are in place in the USA and Russia for the large scale distribution of anhydrous ammonia, including dedicated pipelines stretching for thousands of kilometers. Safety records for the storage, transportation, handling, and manipulation of ammonia are extensive and readily available: the associated risks are deemed on par with those associated with gasoline and liquefied petroleum gas. Last, but not least, ammonia is environmentally friendly: it contains no carbon and it is not a greenhouse gas, and the only associated environmental risk is production of NOx in its combustion. The use of ammonia as a fuel in combustion engines for vehicle propulsion dates back to the 1930's, and is well known and documented. Ammonia was and is utilized in both spark ignition engines and compression ignition engines, but generally in a mixture in combination with traditional fuels. Thus the use of ammonia in combustion engines, as an ingredient for mixed fuels, results in a strong suppression of carbon emissions, but is not entirely carbon free; in addition, production of NOx during the combustion process becomes even more critical.

It is known by the person skilled in the art that an interesting approach for extraction of the energy stored in anhydrous ammonia relies in its dissociation, which will produce molecular nitrogen and hydrogen, according to the reaction:

$$2\ NH_3 \rightarrow N_2 + 3\ H_2.$$

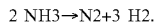

It is immediately clear to the person skilled in the art that the availability of an innovative device or method, able to efficiently and effectively dissociate ammonia into nitrogen and hydrogen while minimizing thermal losses to the surrounding environment, thus preserving the free energy in the hydrogen product stream, which can be in turn converted into DC electrical energy by the use of standard fuel cells, all as part of a cycle substantially completely carbon free as well as free from production of nitric oxide and nitric dioxide, would be very enticeable for a wide variety of large and small scale applications; said device or method could be of interest for large-scale industrial application for storage and regeneration/consumption of energy; in addition, said device or method could serve for the on-vehicle generation of molecular hydrogen from an on-vehicle ammonia tank, with the hydrogen in turn utilized to generate the vehicle's automotive force via fuel cells, all while only molecular nitrogen and water vapors ($H_2O$) would be released into the environment without any pollution, thus realizing a carbon- and NOx-free cycle for vehicle propulsion as well as other industrial uses or consumer uses.

When compared with energy storage in lithium-based (or other type of) electric batteries, as in prevalent use for electric cars, the above mentioned ammonia cycle, capable itself of on-vehicle production of automotive force, is preferable because of its promise of a longer driving range and ease and speed of recharge: an ammonia tank fill of 100 liters would provide a 500-km driving range, comparable to that obtained with a 40 liters gasoline tank fill; an ammonia tank fill would require a procedure and time similar to that of a gasoline tank fill, to be compared to the several hours required to refill electric batteries that typically guarantee a driving range of about 200 km.

In the prior art, devices for anhydrous ammonia dissociation such as plasma reactors and membrane plasma reactor have been discussed and realized. The most advanced device known in the prior art is a membrane plasma reactor: it consists of an outer quartz cylinder, containing an inner metal cylinder, partly covered by a hydrogen separation membrane; in the interstitial space between the quartz surface and the metal cylinder, supplied with the feed $NH_3$ stream, the provision of high voltage discharges induces the formation of a plasma, resulting in nearly complete dissociation of the $NH_3$ molecules. Upon dissociation, the resulting hydrogen radicals (H) are strongly adsorbed by the hydrogen separation membrane, and driven across the membrane itself by diffusion, in consideration of their density gradient. Said membrane plasma reactor was shown to be effective in the production of high-purity nitrogen, as permitted by the hydrogen separation membrane, which strongly inhibits the transfer of $NH_3$ and $N_2$ through the membrane itself. Said reactor does, however, disadvantageously, require provision of very high voltage pulses to generate and sustain the plasma, introducing technological challenges for the handling of the high voltage delivery and control; due to its reliance on an external quartz cylinder as a containment vessel for the $NH_3$ plasma, it does not lend itself to modularized use of the hydrogen separation membrane, thus hindering the possibility of sustaining the production rate of $H_2$ necessary for automotive and industrial applications; last, but not least, it does not lend itself to an optimized recovery of the enthalpy provided to the NH3 feed stream, thus leading to disadvantageous energy inefficiencies, which would in turn make the device less enticing for extraction of energy from NH3, reducing its appeal for adoption in automotive and industrial applications.

OBJECTS AND SUMMARY OF THE INVENTION

It is an object of the present invention to overcome the drawbacks of the background art.

It is a further object of the present invention to describe a high-efficiency separation system, said separation system will comprise a compact device for hydrogen production from an NH3 reservoir, comprising a device for NH3 dissociation, resulting in the production of a ultra-pure H2 stream, to be used in fuel cells such as to generate energy in form of DC electricity, which in turn can be used for a variety of uses, and preferably, vehicle propulsion; resulting at the same time in production of waste streams containing solely N2 (from the ammonia dissociation stage) and H2O (from the stage of oxidation of hydrogen in the associated fuel cells); therefore providing a cycle of energy storage and release completely free of carbon and at the same time intrinsically inhibited from producing NOx.

It is a further object of the present invention to describe a system for H2 production from an NH3 reservoir that would be easily scalable to fit a variable range of H2 production rates, hence satisfying a varied range of needs, from vehicle propulsions to various large-scale industrial uses and possible small-scale consumer uses.

It is a further object of the present invention to describe a system for NH3 dissociation that operates, in the core region of the NH3 plasma where NH3 dissociation takes place, at the lowest possible temperature, such as to increase the life span and long term reliability of components and to decrease the complexity of the device.

It is a further object of the present invention to describe a system for NH3 dissociation that utilizes the lowest possible voltage for induction of spark-inducing plasma, such as to increase the life span and long term reliability of components and to decrease the complexity of the device.

It is a further object of the present invention to describe an innovative system having advantageously the best efficiency in recovering the enthalpy provided to the input NH3 feed stream as its temperature is elevated to that of the NH3 plasma region, by use of an efficient and effective global heat exchanger, where the feed NH3 stream is run in countercurrent with the product N2 and H2 streams.

It is a further object of the present invention to describe a system able to strip from the waste stream any residual of NH3 and H2, limiting the composition of the waste to virtually the sole N2 and H2O elements.

It is a further object of the present invention to describe an innovative system for H2 production that lends itself to the modularized, large-scale deployment of hydrogen separation membranes, such as to provide wide and tunable ranges for the product flow rate F of the product H2 stream generated by the device itself.

Finally, another object of the present invention is to describe an innovative system for H2 production coupled with an energy storage system, made of a H2 reservoir and/or electrical battery system, which can be used to quickly and autonomously warm the NH3 dissociation unit, such as to bring it rapidly within the operating temperature range at the time of its start of operation.

This and further objects of the present invention will be advantageously realized by the construction of an innovative system for hydrogen production from NH3, said system being a separation system, comprising at least an hydrogen exhaust chamber, at least an hydrogen separation membrane and an ammonia distribution system, comprising a system suitable for inducing the formation of a plasma in the region between the hydrogen separation membrane and the ammonia distribution system, resulting in nearly complete dissociation of the NH3 molecules and subsequent diffusion of the resulting H and H2 through the hydrogen separation membrane, said separation system being characterized in comprising at least a single hydrogen exhaust chamber for H2, and in comprising an energy economizing global heat exchanger dedicated to the optimized recovery of the enthalpy provided to the feed NH3 stream, by running in countercurrent, within the energy economizing heat exchanger, the feed NH3 stream and the product N2 and H2 streams (the flow rate of the latter bring F), such as to maximize the energy efficiency of the system.

And more, said system comprising innovatively at least one or more hydrogen separation membranes, said chamber operating at low pressure such as to maximize the gradient of H and H2 across the one or more hydrogen separation membranes to the chamber, said gradient being optimized by the regulation of the H2 pressure, downstream of the hydrogen exhaust chamber and across fuel cells, by means of a pressure and/or flow regulating valve, said pressure and/or flow regulating valve being positioned between said chamber and said fuel cells, thus optimizing said gradient and optimizing the product H2 stream flow rate F.

The flow of H2 to the fuel cell system being regulated by means of a dedicated pressure and/or flow regulating valve, so is the NH3 feed stream fed to the separation system, which is also regulated by means of a dedicated inlet valve. So, at the core of the present invention there is a change in the structure of the reactor. No quartz cylinder is involved. Advantageously, instead, a single chamber, preferably built of metal, serves as the exhaust for the H2 separated by the single or multiple set of membranes; as said, the chamber is built in such a way that it can be operated at low pressure; in fact, the presence and action of regulating valves (the flow of H2 to the fuel cell system being further regulated by means of a dedicated outlet valve so as the inlet of NH3 in the separation system is in turn regulated by means of a dedicated inlet valve) allows to regulate the H2 pressure downstream of the hydrogen exhaust chambers to values slightly above the exhaust of the fuels cells, necessarily set at atmospheric pressure; a typical operating value for the H2 pressure downstream of the hydrogen exhaust chamber is in the range of 2 bara; this allows to optimize the gradient of H2 across the hydrogen separation membranes and thus to optimize the production rate (F) of H2.

In a further embodiment of the present invention the chamber can even be partially or nearly totally evacuated below atmospheric pressure by the use of an appropriate pump; in fact, the optional presence of a pump allows to minimize the pressure in the hydrogen exhaust chamber, and at the same time to increase the pressure in the H2 tank receiving the H2 product stream with flow rate F, optimizing the storage of H2 to be used as a local energy buffer; as a consequence, this permits to maximize the gradient of H and H2 in the hydrogen separation membrane, and, in turn, to maximize the product H2 stream flow rate F, and, at the same time, minimizing the transfer of heat from the hydrogen separation membrane, containing the plasma region, to the surrounding chamber.

Advantageously, this single hydrogen exhaust chamber can host a single or a multiple set of membranes, therefore, in turn, supporting a larger active surface of separation, and therefore, in turn, easing the construction of hydrogen production units capable to sustain large production rates of hydrogen and their adoption for automotive, industrial, and consumer applications.

Innovatively, said fuel cells system is apt to release the energy from H2 oxidation in form of DC electricity, ready for consumption in a variety of uses. Said one or more hydrogen separation membrane being preferably in form of thin tubes with one open end and one closed end, and being tightly separated by a small interstitial space from an ammonia distribution system, preferably in form of metal (preferably stainless steel); the tubes with both open ends, running inside the hydrogen separation membranes with the further presence of spark tips between the hydrogen separation membrane and the ammonia distribution system, preferably in form of sharp tips connected with the ammonia distribution system.

And more, the innovative separation system being also characterized by comprising of a thermal insulation system, encapsulating both the NH3 dissociation device and the energy economizing global heat exchanger, preferably in form of a vacuum insulation system akin to a cryostat.

In a prototyping phase, the chamber can conveniently accommodate membranes in form of Pd—Ag tubes, with thicknesses ranging in a few tens of micrometers, whose properties as hydrogen separation membranes have been known for decades and are well documented and detailed in the literature, and which are most commonly in use for H2 purifiers, supplying high purity H2 for a variety of basic science and industrial applications.

The shell-like geometry of standard Pd—Ag tubes seamlessly allows the insertion, within the Pd—Ag membrane/shell, of an ammonia distribution system, in form of a tube-in-shell metal (preferably stainless steel) tube with two open ends, such as to allow NH3 feed in the interstitial space between the hydrogen separation membrane and the ammonia distribution system, with the product N2 stream conveyed into the open end located in proximity of the closed end of the hydrogen separation membrane, and, finally, extracted from the other open end of the tubular ammonia distribution system; this topology, which is the one commonly adopted in industrial and research hydrogen purifiers, is innovatively described here for the first time in the context of a device for hydrogen production from ammonia dissociation; in a very advantageous way, this particular configuration allows to feed the flow of ammonia in the annular region between the hydrogen separation membrane (preferably, a Pd—Ag membrane/shell) and the ammonia distribution system (preferably, a tube-in-shell stainless steel tube), thus maximizing the surface to volume ratio between the surface of the hydrogen separation membrane/shell and the volume of the region, comprised between the hydrogen separation membrane/shell and the ammonia distribution system/tube, where the ammonia plasma is excited, with the resulting advantage of maximizing the production rate of hydrogen per unit area of active hydrogen separation membrane; the resulting nitrogen exhaust stream is conveyed, at the closed end of the Pd—Ag tube, on the inside of the stainless steel tube, and from there conveyed outside the system through the second open end or the stainless steel tube.

In a very innovative way, this specific configuration, besides maximizing the region of contact between the ammonia plasma and the hydrogen separation membrane, thus maximizing the hydrogen production rate, also incorporates within the stainless steel tube a number of spark tips, which help reducing the peak voltage of the HV pulse to be delivered to sustain the plasma formation; the reduction of the HV peak pulse allows to simplify the design of the HV delivery and control systems.

In addition, another novelty is the introduction of an energy economizing global heat exchanger to nearly fully recover the enthalpy provided to the NH3 feed stream to bring the gas in the operating temperature range required for NH3 dissociation. This is particularly important because energy in form of heat will be transferred to the ammonia and from there to the hydrogen separation membrane and to the hydrogen exhaust chamber. The lack of an energy/enthalpy recovery system would hinder the overall performance of the system as energy will be lost, in form of heat, to the environment. The present invention describes a system that economizes the loss of efficiency by recovering nearly all the heat provided to the NH3 feed stream by the use of an integrated energy economizing global heat exchanger, where the feed NH3 stream is run in counter-current with the product N2 and H2 stream, thus achieving the best possible energy efficiency for the hydrogen separation system.

In addition, another novelty is the introduction of a heat insulation system, preferably in form of a vacuum insulation system, consisting of a vacuum region equipped with multi-layer insulation foils, akin to a cryostat, encapsulating both the NH3 dissociation device and the energy economizing global heat exchanger, to nearly fully minimize losses of heat to the surrounding environment, thus achieving the best possible energy efficiency for the overall device.

Another innovative aspect advantageously described by the present invention is the introduction of heating coils to pre-heat the H2 exhaust chamber hosting the hydrogen separation membrane(s), along with the introduction of an electrical battery system and/or H2 storage tank; the combination of these units, with the H2 and or electrical batteries providing the necessary energy to the heating coils, permits to heat the ammonia dissociation device and bring it into the temperature range required to initiate ammonia dissociation, all starting from energy locally stored in a H2 reservoir and/or in electric batteries.

Last, but not least, also innovative and advantageous is the introduction of a three-bed PSA system for recovery and recycle of NH3 and H2 traces from the N2 waste; this is particularly advantageous as it potentially provides guarantee that the waste stream released in the atmosphere from the hydrogen separation membrane is only (or predominantly, at a high purity level) made of N2, from the ammonia dissociation stage (in addition, of course, to H2O from the H2 oxidation in the fuel cells).

Other possible embodiments include, and are not limited to:

1. Possible use of Zr- and Ni-based membranes, with the advantage of reducing costs with respect to the standard Pd—Ag hydrogen separation membranes;

2. Substitution of membranes with ceramic-supported thin layers or monolayers, with the advantage of decreasing the thickness of hydrogen separation membrane to be crossed by H and H2, thus in turn increasing the hydrogen production rate;

3. Use of different geometries for maximizing contact between NH3 and the hydrogen separation membrane, with the possible advantage of permitting different modular construction of the NH3 dissociation device, possibly resulting in an increase of the ratio between the active surface of hydrogen separation membranes and the overall volume of the NH3 dissociation device;

4. Use of different geometries for spark tips, with the advantage of further reducing the voltage peak pulse required for induction of plasma, and making even more practical the delivery of HV and its control;

5. Inclusion of a vacuum pump to decrease the pressure of the H2 exhaust chamber and therefore increase the pressure differential through membrane, thus maximizing the H and H2 gradient in the membrane and the overall H2 production rate; a second, direct benefit of the operation of the H2 exhaust chamber at low pressure, is the minimization of heat transferred to the exhaust chamber itself and in need of a recovery from potential losses through the heat barrier provided by the heat insulation system.

BRIEF DESCRIPTION OF THE DRAWINGS

This and more advantages obtained thanks to the here described innovative device for NH3 dissociation and H2 production will be further described hereinafter with reference to non-limitative examples, which are provided for explanatory, non-limitative purposes in the accompanying drawings. These drawings illustrate different aspects and embodiments of this invention and, where appropriate, the structures, components, materials and/or similar elements are indicated in the different figures with similar reference numbers.

DETAILED DESCRIPTION OF THE INVENTION

Figure 1:
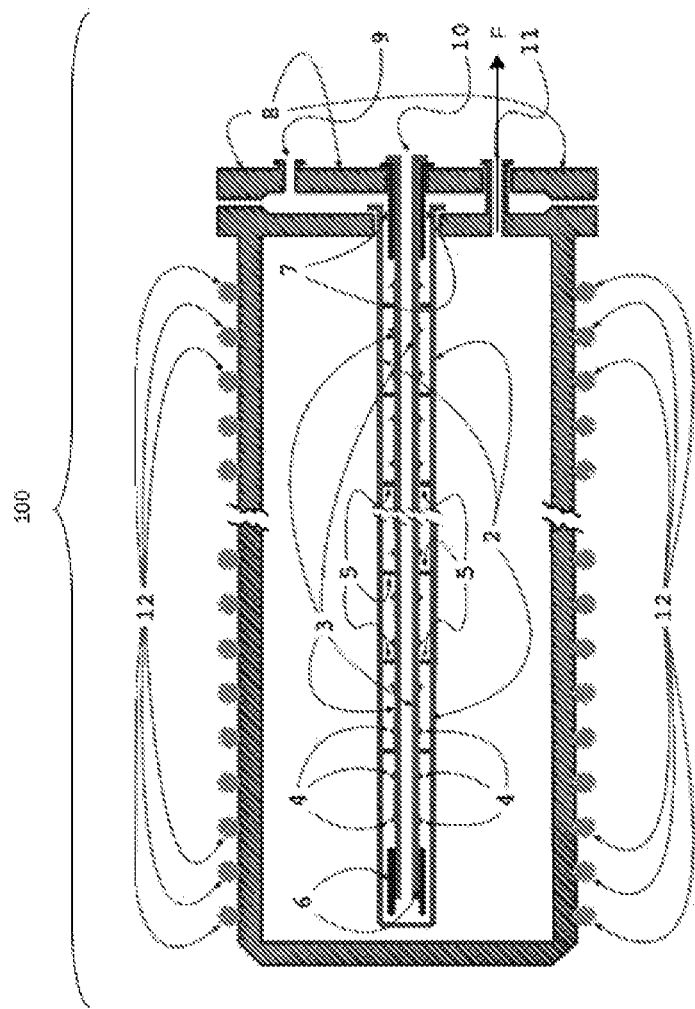
FIG. 1 illustrates a preferred embodiment of the device for the on-board dissociation of NH3 and production of H2 according to the present invention.

While the invention is susceptible to various modifications and alternative constructions, some of the illustrated embodiments are shown in the drawings and will be described below in detail.

It must be understood, however, that there is no intention to limit the invention to the specific illustrated embodiments, but, on the contrary, the invention intends to cover all the modifications, alternative constructions and equivalents that fall within the scope of the invention as defined in the claims.

The use of "such as", "etc.", "or" indicates non-exclusive alternatives without limitations, unless otherwise indicated.

The use of "includes" means "includes, but is not limited to", unless otherwise indicated.

FIG. 1 illustrates a preferred embodiment of the innovative separation system for hydrogen production.

The main containment vessel or hydrogen exhaust chamber 100 of the separation system 1 is preferably made of stainless steel or other heat resistant metal (zirconium). The separation system comprises one or more Pd-based H2 separation membranes 2, composed preferably of a Pd (77%)-Ag (23%) shell with a closed end and a (preferably) metal (stainless steel, zirconium) with an internal tube-in-shell 3 serving as the ammonia distribution system, equipped with sharp spark tips 4. The tube 3 is aligned at the center of the membrane/shell 2 by use of the insulating aligners 5, which contain hollow sections in such a way that they do not interrupt the gas flow. NH3 enters in the reactor through inlet port 9, the inlet port in the present embodiment comprising an inlet regulating valve 51 (shown in FIG. 2) and flows in the space between the membrane/shell 2 and the tube 3. The temperature is maintained in the range 500-800 K by the heating coils 12.

Plasma dissociation of NH3 is also innovatively aided by plasma discharges at the relatively low voltages (a few hundred V) that are applied between the ammonia distribution system (tube 3) and the hydrogen separation membrane (shell 2), and originated at the spark tips 4 connected with the tube 3. To ensure that the plasma discharges are concentrated along the section of the tube 3 and shell 2 removed from their two ends, the two ends of the tube 3 is covered at its start and end by insulating sleeves 6 and 7.

NH3 is completely dissociated and the H radical are strongly adsorbed by the Pd—Ag membrane, then driven to diffuse through the membrane by the strong pressure differential across it: typically, the pressure on the interior of the Pd—Ag membrane is in the range from 8 to 10 bar of absolute pressure (also bara) sourced by the room temperature liquid NH3 storage, and the pressure on the exterior of the membrane is controlled in the neighborhood of a few bara, typically but not limited to 2 bara, i.e., it is operated in a regime of much lower pressure than the pressure of NH3. Said low pressure, i.e., pressure of 2 bara or nearby values, innovatively and advantageously permits to maximize the gradient of H and H2 across the one or more hydrogen separation membranes to the chamber 100, said gradient being maximized by the regulation of pressure of H2 downstream of the hydrogen exhaust pressure chamber 100, thus maximizing the product H2 flow rate (F).

H2 is extracted through the H2 extraction port 11 and its purity is guaranteed to be greater than 99.999% thanks to the operating properties of the hydrogen separation chamber 100. The extraction port can comprise in one embodiment an outlet valve 52 (here not shown, but shown in FIG. 2) for regulating the product H2 stream 25 flow rate F. The device comprises also an outlet port 10 for N2. As also mentioned above, the insulators 6 and 7 serve to prevent electrical discharges sustaining the NH3 plasma from focusing at the two ends of the hydrogen separation membrane 2 and of the associated ammonia distribution system 3. The flange 8 seals the hydrogen exhaust chamber 100, while also housing the inlet of the NH3 feed stream as well as the outlet of N2 waste stream and of the H2 product stream; the outlet of N2 being regulated by a dedicated outlet valve 53 (shown in FIG. 2).

Figure 2:
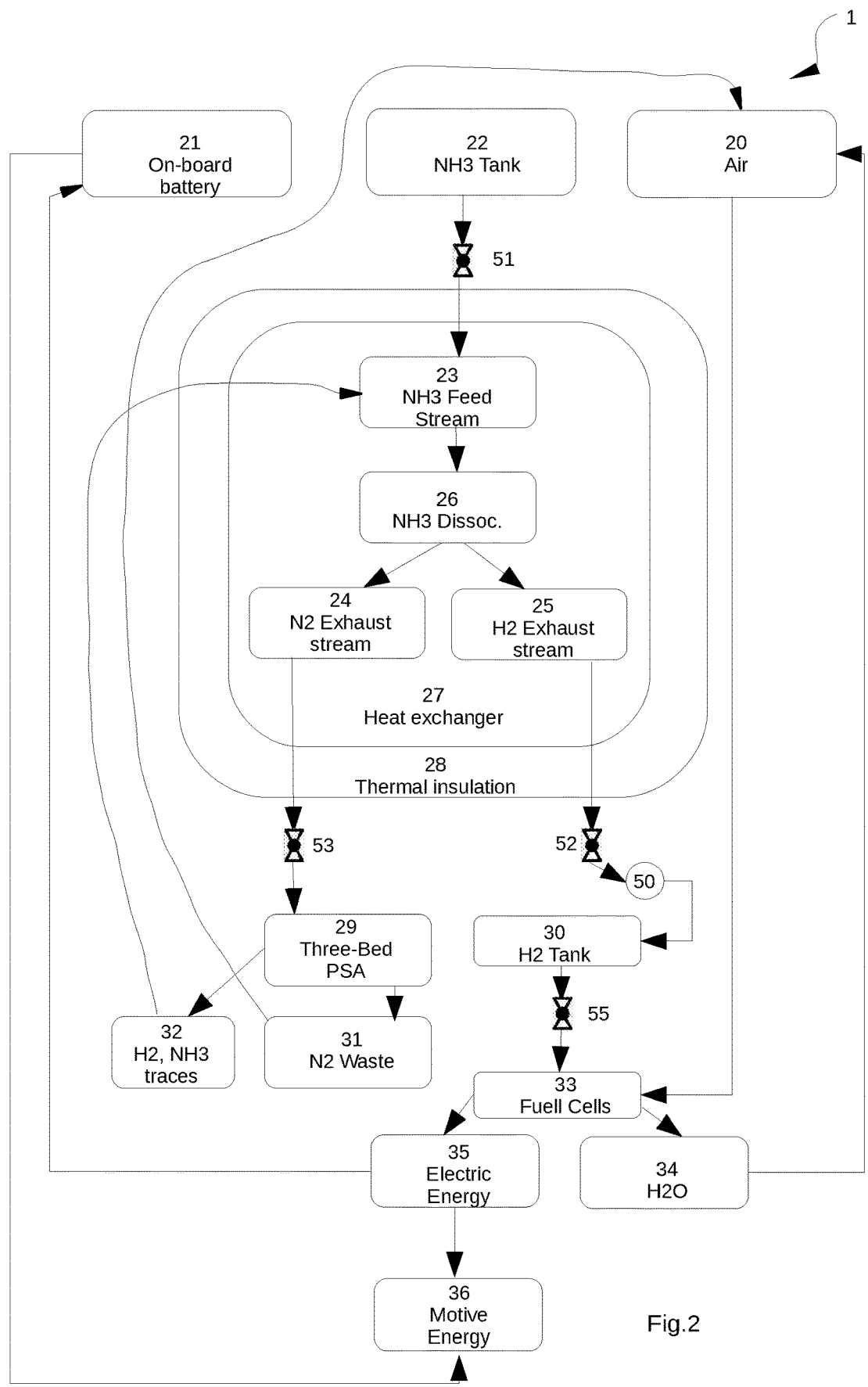
FIG. 2 illustrates a flow chart of a preferred embodiment of the process that occurs in the innovative device described according to the present invention.

FIG. 2 illustrates the separation system, that is an ammonia dissociation device with associated innovatively an enthalpy recovery system, comprising of a countercurrent energy economizing global heat exchanger 27 and a very efficient thermal insulation 28, preferably in form of a vacuum insulated cryostat, an hydrogen economizer 29, composed of a pressure swing-adsorption (PSA) unit, preferably with a three-bed absorption system, and of energy storage for the device bootstrap, composed of an H2 reservoir tank 30 and an on-board electric battery 21.

A NH3 tank 22 provides the NH3 feed stream 23 to the ammonia dissociation device 26, i.e., the chamber 100 of FIG. 1, which separates it into two exhaust streams, the N2 stream 24 and the H2 stream 25. The ammonia dissociator is enclosed into a high-efficiency countercurrent energy economizing global heat exchanger 27 that treats the feed stream 23 and the two exhaust streams 25 and 26, specifically recovering the enthalpy from the two hot exhaust streams and transferring it to the cold feed stream; the high-efficiency energy economizing global heat exchanger 27 must reach efficiencies greater than 95%, and is completely enclosed, along with the ammonia dissociator, in an efficient thermal insulator system 28.

The N2 exhaust stream, extracted from the ammonia dissociation device 26 through port 10, may contain small NH3 and H2 impurities: after cooling in the energy economizing global heat exchanger 27, the N2 exhaust stream is directed through a pressure-swing adsorption (PSA) unit 29, preferably with a three-bed adsorption system, which removes the NH3 and H2 traces 32, which can then be pumped back into the feed stream 23.

Upon cooling, the H2 stream 25, whose purity is ensured to be better than 99.999% by means of the H2 separation membranes 2, as the final product, is driven by pressure differential, obtained thanks to said pressure regulating valve 55, to a H2 storage tank 30, and, from there, to the fuel cells 33 where it is advantageously converted, via oxidation with O2 coming from air 20, into water 34 and electric energy 35.

So said hydrogen exhaust chamber 100 is adapted to operate at low pressure such as to optimize the gradient of H and H2 across the one or more hydrogen separation membranes 2 to the chamber 100, said hydrogen separation membrane(s) being adapted to optimize the H2 and H gradient passing trough said membrane, said flow and/or pressure regulating valve 55 regulates the H2 pressure downstream of the hydrogen exhaust chamber 100, said regulating valve 55 being positioned between said chamber 100 and the associated fuel cells 33, thus maintaining said gradient and optimizing the product H2 stream 25 flow rate F.

Water vapors 34 are returned to air 20. Electric energy 35 can be stored in onboard battery 21 and/or turned into motive energy 36, such as required to move a car, truck, or bus.

As said here above, a pump 50 can be optionally introduced to decrease the pressure of the H2 exhaust chamber 100 (corresponding to unit 26 in FIG. 2) and therefore increase the pressure differential through membrane 2, thus maximizing the H and H2 gradient in the membrane and the overall H2 production rate; the second, direct benefit of the operation of the H2 exhaust chamber at low pressure, is the minimization of heat transferred to the exhaust chamber itself and in need of a recovery from potential losses through the heat barrier provided by the heat insulation system. In particular, in one embodiment the pump 50 is positioned between the release point or extraction port 11 of the H2 product stream 25 from the hydrogen exhaust chamber 100 and the H2 tank 30.

When the ammonia dissociation device or separation system is cold and needs to be brought to temperature for initiating operations, that can be achieved by the use of electric energy from the on-board battery 21 and/or from the electric energy 35 produced by the H2 stored in the H2 tank 30.

So it appears clear form the description of the innovative components of said innovative separation system 1 that all the described objects are obtained by means of said optimization of the gradient of H2 across the hydrogen separation membranes 2 to the chamber 100, which creates a pressure driven continuous flow of H2 to the H2 tank 30 and fuel cells 33, with the pressure downstream the hydrogen exhaust chamber optimized by the presence and action of a pressure and/or flow regulating valve 55 and of pressure and/or flow regulating valves 51 and 52, thus optimizing the production of H2; by means of the surface of the separation membrane(s) that permits to optimize the separation of H2; by means of spark tips between the hydrogen separation membrane (membrane/shell 2) and the ammonia distribution system (tube 3), preferably in form of sharp tips connected with the ammonia distribution system (tube 3), which help reducing the peak voltage of the HV pulse to be delivered to sustain the plasma formation; the reduction of the HV peak pulse allows to simplify the design of the HV delivery and control systems; by means of the introduction of an energy economizing global heat exchanger 27 and of a thermal insulation system 28 to nearly fully recover the enthalpy provided to the NH3 feed stream to bring the gas in the operating temperature range required for NH3 dissociation, a system, that is, which economizes the loss of efficiency by recovering nearly all the heat provided to the NH3 feed stream by the use of an integrated energy economizing global heat exchanger, where the feed NH3 stream is run in countercurrent with the product N2 and H2 stream, thus achieving the best possible energy efficiency for the hydrogen separation system; and more here above described.

Please note that in further embodiment the separation system 1 may comprise all said pressure and/or flow regulating valves 51, 52, 53, 55 or only some of those valves, or none of those valves or another plurality of valves. These and further objects of the present invention are achieved by means of the innovative separation system for the production of hydrogen comprising the features of the annexed claims, which form an integral part of the present description.

It appears also clear that a method could be introduced to describe step by step the functioning of said innovative system, but this appears pleonastic as a method for using the present system is implied by describing the functioning of the system itself. Applicant believes that the detailed explanation of the embodiments herein described are adapted to sufficiently and exhaustively describe the system and his innovative effect, the description of a method would be modeled simply on the explanation of the operation of the system and can obviously be deduced by the system functioning without introducing new subject matter or extending the field of the present invention.

So modifications in the dimension of the chamber, the number and type of the hydrogen separation membrane, the type and structure of the chamber, the type and structure of the enthalpy recovery system, the material and form of the spark tips, tubes, chambers, valves and further systems, isolation materials, number and type of valves and pumps, etc., are to be considered only non-significant modifications of some realizations embodiment of the present invention and have to be considered covered by the object of the present invention as here above described and better explicated with reference to the annexed claims.

What is claimed is:

1. A separation system for hydrogen production from NH3, comprising:
   at least an hydrogen exhaust chamber,
   at least an hydrogen separation membrane,
   an ammonia distribution system,
   a system inducing the formation of a plasma in the region between the hydrogen separation membrane and the ammonia distribution system, resulting in nearly complete dissociation of the NH3 molecules and subsequent diffusion of the resulting H and H2 through the hydrogen separation membrane,
   at least a single hydrogen exhaust chamber for H2, and
   an energy economizing global heat exchanger dedicated to an optimized recovery of the enthalpy provided to a feed NH3 stream, by running in countercurrent, within the energy economizing global heat exchanger, the feed NH3 stream and a product N2 and H2 stream, such as to maximize the energy efficiency of the system.

2. The separation system for hydrogen production from NH3 according to the claim 1, comprising a thermal insulation system encapsulating both an NH3 dissociation device and the energy economizing global heat exchanger in form of a vacuum insulation system, in use for minimizing thermal losses to the surrounding environment and further optimizing the energy efficiency of said system.

3. The separation system for hydrogen production from NH3 according to claim 1, wherein said single hydrogen exhaust chamber can host a single or a multiple set of membranes, supporting a larger active surface of separation, easing the construction of hydrogen production units capable to sustain large production rates of hydrogen and their adoption for automotive, industrial, and consumer applications.

4. The separation system for hydrogen production from NH3 according to claim 1, wherein said hydrogen exhaust chamber being adapted to operate at low pressure such as to optimize the gradient of H and H2 across the one or more hydrogen separation membranes to the chamber, said hydrogen separation membrane(s) being adapted to optimize the H2 and H gradient passing trough said membrane, a flow and/or pressure regulating valve being adapted to regulate the H2 pressure downstream of the hydrogen exhaust chamber, said regulating valve being positioned between said chamber and the associated fuel cells, thus maintaining said gradient and optimizing the product H2 stream flow rate.

5. The separation system for hydrogen production from NH3 according to claim 1, wherein said system comprises a pump, positioned between the release point of the H2 product stream from the hydrogen exhaust chamber and the H2 tank, which allows to minimize the pressure in the hydrogen exhaust chamber and at the same time permits to increase the pressure in a H2 tank receiving the H2 product stream, which at the same time maximizes the storage of H2 as well as the gradient of H and H2 in the hydrogen separation membrane, and, in turn, maximizes the H2 product stream flow rate.

6. The separation system- for hydrogen production from NH3 according to claim 3, wherein said system comprises one or more Pd-based hydrogen separation membrane(s), composed preferably of a shell with a closed end, equipped with an internal ammonia distribution system, preferably in the form of a tube-in-shell, preferably made of stainless steel or other metal.

7. The separation system for hydrogen production from NH3 according to claim 6, wherein the configuration of said at least one or more Pd-based hydrogen separation membrane(s) or shell(s) permits to feed the flow of ammonia in the annular region between the hydrogen separation membrane or shell and the ammonia distribution system or tube, maximizing the surface to volume ratio between the surface of the hydrogen separation membrane or shell and the volume of the region, comprised between the hydrogen separation membrane or shell and the ammonia distribution system or tube, where the ammonia plasma is induced, so in turn maximizing the production rate of hydrogen per unit area of active hydrogen separation membrane or shell.

8. The separation system for hydrogen production from NH3 according claim 1, wherein said ammonia distribution system or tube comprises sharp spark tips, positioned in the region between the hydrogen separation membrane or shell and the ammonia distribution system or tube, said spark tip easing the generation plasma discharges at relatively low voltages, thus helping to reduce the peak voltage of the HV pulse to be delivered to sustain the plasma induction and formation, in turn aiding plasma dissociation of NH3.

9. The separation system for hydrogen production from NH3 according to claim 1, wherein the separation system is equipped with an energy storage system, made of a H2 tank and/or electrical battery system, which can be used to provide the energy to quickly and autonomously warm the NH3 dissociation unit through the heating coils, such as to bring it rapidly within the operating temperature range at the time of its start of operation.

10. The separation system for hydrogen production from NH3 according to claim 3, wherein the hydrogen separation membranes are made of Zr and Ni-based membranes, with the advantage of reducing costs with respect to standard Pd-Ag hydrogen separation membranes, or are substituted with ceramic-supported thin layers or monolayers, with the advantage of decreasing the thickness of hydrogen separation membrane to be crossed by H and H2, thus in turn increasing the hydrogen production rate, or are substituted with hydrogen separation membranes of different geometries for maximizing contact between NH3 and the hydrogen separation membrane, with the advantage of permitting different modular construction of the NH3 dissociation device, with consequential modification of the corresponding geometry of the ammonia distribution system, advantageously resulting in an increase of the ratio between the active surface of hydrogen separation membranes and the overall volume of the NH3 plasma region.

* * * * *